Jan. 13, 1959     C. E. TERRELL     2,868,013
FLUID MEASURING APPARATUS AND VALVE EMBODIED THEREIN
Filed Nov. 1, 1954     3 Sheets-Sheet 2
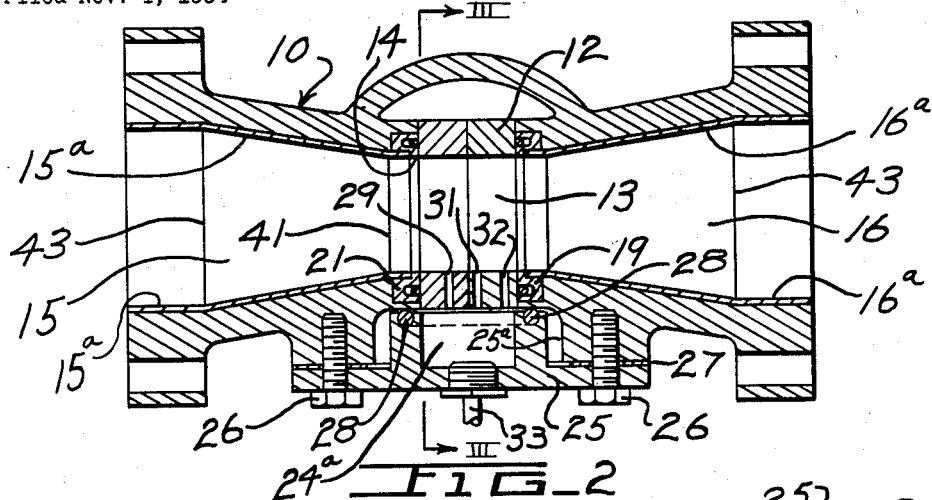
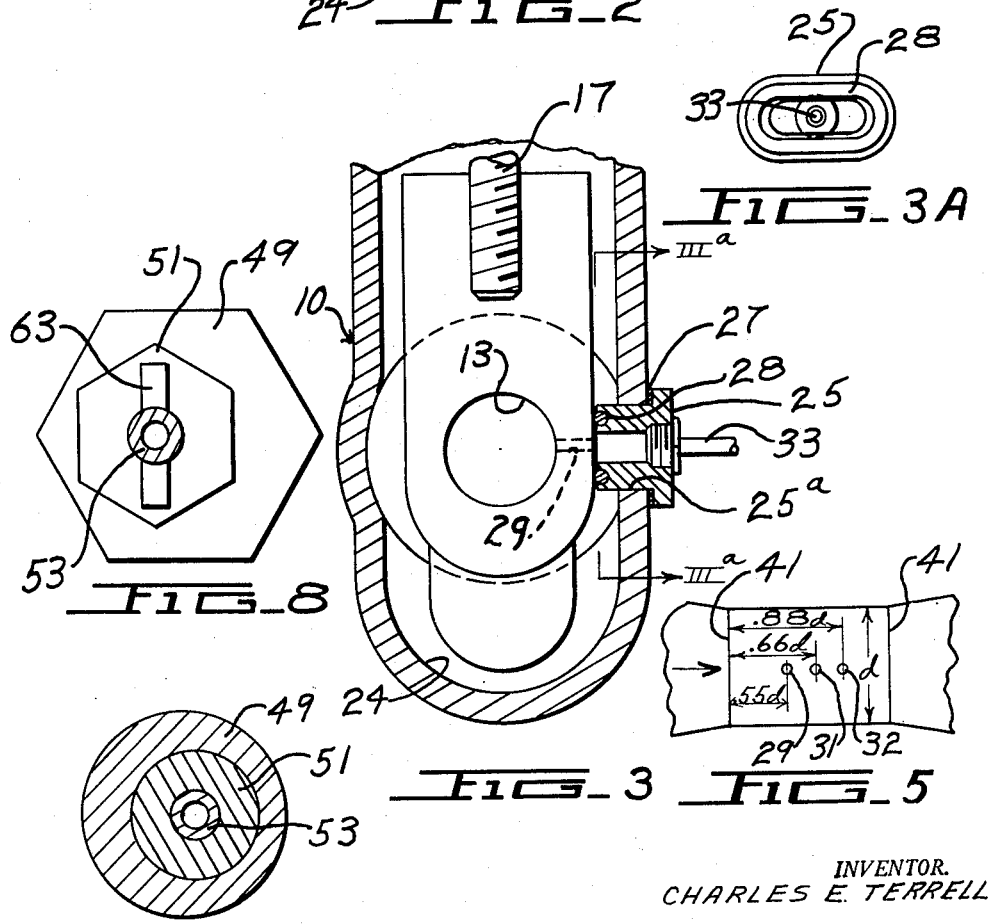
INVENTOR.
CHARLES E. TERRELL
BY
Jennings & Carter
ATTORNEYS Jan. 13, 1959     C. E. TERRELL     2,868,013
FLUID MEASURING APPARATUS AND VALVE EMBODIED THEREIN
Filed Nov. 1, 1954     3 Sheets-Sheet 3
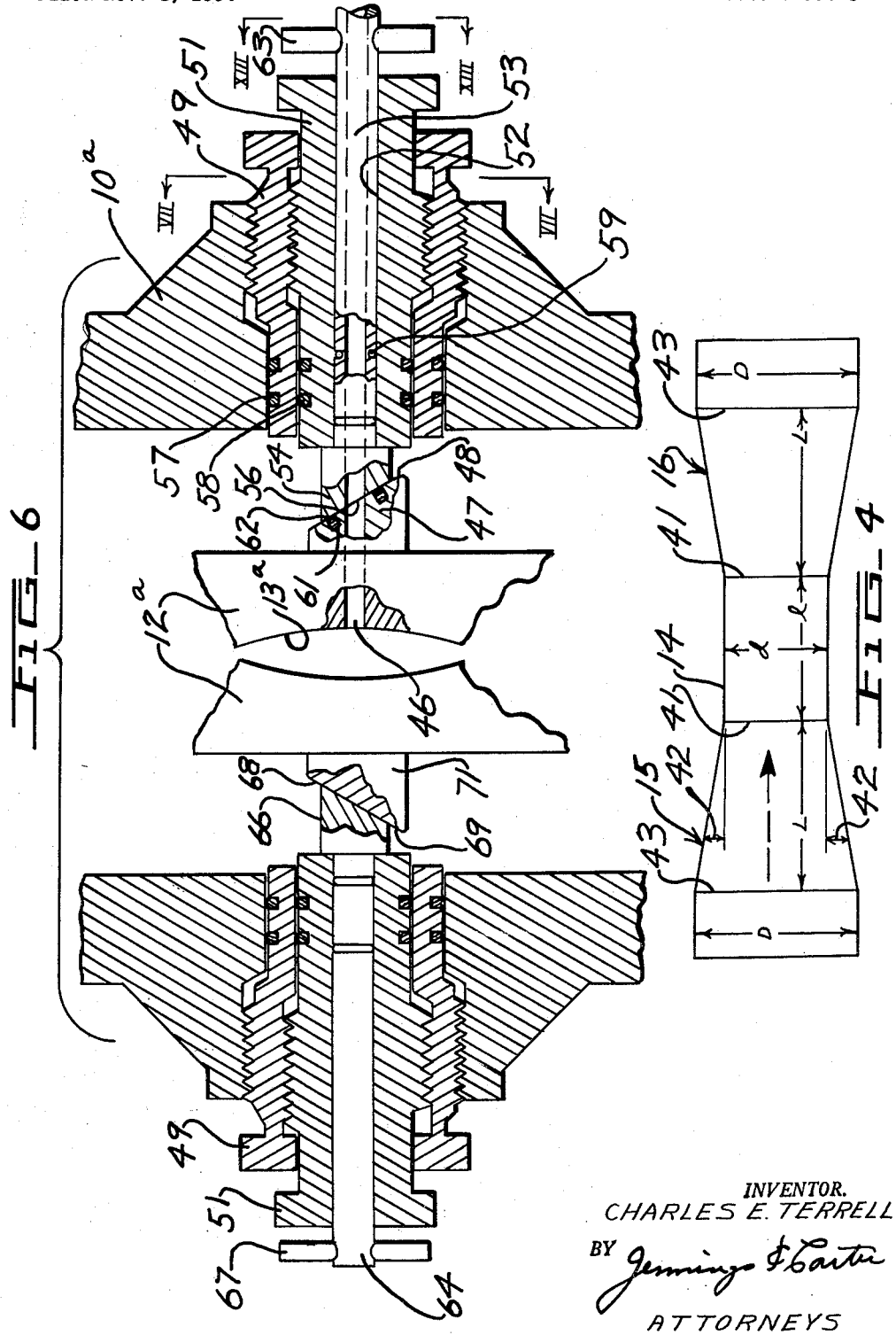
INVENTOR.
CHARLES E. TERRELL
BY Jennings F Carter
ATTORNEYS United States Patent Office 2,868,013
Patented Jan. 13, 1959

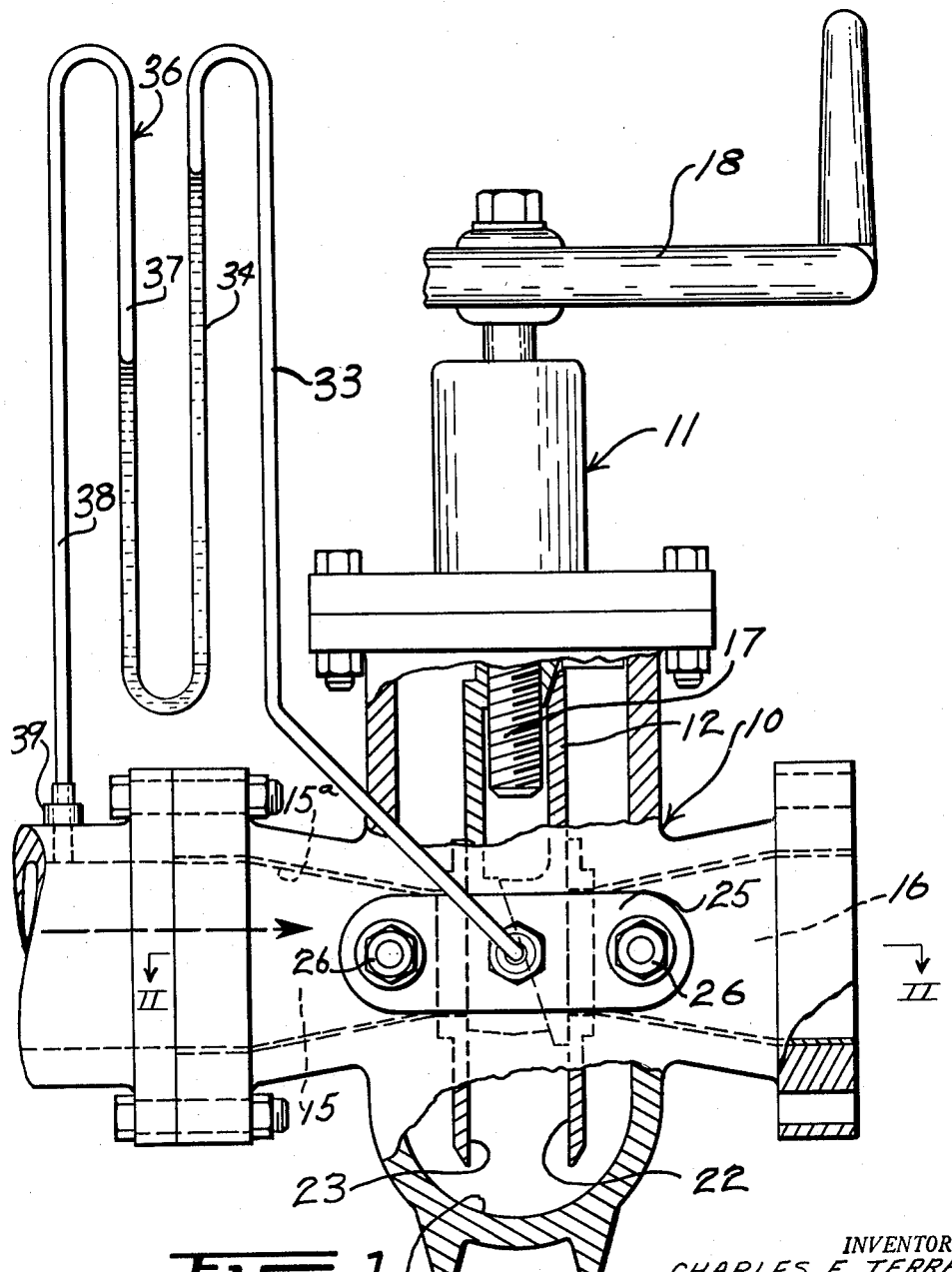

2,868,013

FLUID MEASURING APPARATUS AND VALVE EMBODIED THEREIN

Charles E. Terrell, Birmingham, Ala.

Application November 1, 1954, Serial No. 466,059

6 Claims. (Cl. 73—213)

My invention relates to apparatus of the head meter type for measuring the flow of fluids and to a fluid control valve embodied in such apparatus.

An object of my invention is to provide fluid measuring apparatus of the head meter type employing a frusto conical convergent inlet in combination with a cylindrical throat section which may accurately be reproduced in the same or different sizes from predetermined mathematical formulae, and which when so constructed has predetermined characteristics of flow, pressure recovery and pressure drop in the throat, and which has a co-efficient of discharge closely approximating unity.

Another object is to provide fluid measuring apparatus of the head meter type with a frusto conical convergent section combined with a cylindrical throat section which is as accurate a measuring device as is the square edged orifice, but which has pressure recovery characteristics considerably higher than the square edged orifice, closely approximating the pressure recovery characteristics of the standard Venturi tube, whereby my improved apparatus is entirely practical for use in measuring flow of relatively valuable fluids such as natural gas in transmission lines with a minimum loss of pressure.

Another object is to provide fluid measuring apparatus of the character designated in which the angle on the upstream side of the fluid passage at the intersection of the convergent cone and the cylindrical throat sections is formed as an unbroken or sharp angle as distinguished from a broken or rounded angle as found in standard Venturi tubes, whereby the passageway of the correct configuration and dimensions in my improved apparatus may accurately be machined and definitely located in accordance with a mathematical formula, assuring complete reproducibility of the apparatus from the production standpoint.

Another object is to provide a measuring device having the foregoing characteristics in which means is provided for obtaining the mean of a plurality of pressure readings from axially spaced positions in the throat thereof, said readings being taken at such points axially along the throat that the mean thereof for all practical purposes results in a coefficient of discharge equal to unity.

Another object is to provide measuring apparatus of the character designated in the throat of which there may be placed a closure, either of the slidable or rotatable type, whereby the apparatus serves both as a flow measuring apparatus and as a shut-off valve for the line in which the same may be installed.

A further object is to provide improved means for accurately aligning the through opening in a slidable closure plate with the through passageway in the throat of the housing, which means serves both to act as a stop for the closure on its opening movement and as a final centering and aligning means for the closure, one of the aligning means having an opening or openings therein communicating with an opening in the edge of the closure in turn opening into the through opening provided in the closure, whereby the pressure inside the valve throat may be obtained for measuring purposes.

A still further object is to provide a flow measuring device in which the co-efficient of discharge is substantially unity when the beta (as hereinafter set forth), of the apparatus is on the order of six hundred thousandths (.600) to six hundred twenty-five thousandths (.625).

Briefly, my invention contemplates a flow measuring device having a cylindrical throat section and a frusto conical convergent inlet section on the upstream side of the throat section. Located at a given distance from the upstream end of the throat section are one or more openings extending laterally of the throat passage through which pressure in the throat of the apparatus may be determined from outside the apparatus. The relation of the diameter of the throat to the major diameter of the conical section (beta) is maintained at from .600 to .625. When a plurality of lateral openings are used they are spaced axially from the upstream edge of the throat at approximately .55d, .66d, .88d, where d is the diameter of the throat. For convenience, the openings may communicate with a common chamber arranged on the side of the apparatus. A single line leading from this chamber is connected to one leg of a manometer or the like while the other leg is connected to the conduit in which the measuring apparatus is placed, upstream from the apparatus. In this way, if the several openings are located as hereinafter set forth, it will be found that the coefficient of discharge is substantially unity. Further, I form the angle at the intersection of the throat and the convergent upstream inlet section as a sharp angle as distinguished from an easy tangential curve as used in present Venturi meters. This feature in combination with the specifically located pressure openings or taps results in a measuring apparatus having a high degree of accuracy. When the features above discussed are incorporated in a slidable plate type valve, the openings referred to are drilled laterally into the through opening of the closure plate or plates and may open into the common chamber mentioned which is provided on the side of the valve and with which the lateral openings all communicate when the valve is in fully open position. In some instances it may be desirable to have a single opening located as hereinafter referred to. In such case this opening is laterally directed from the edge of the closure into the through opening thereof and seal means is provided to assure an accurate reading of the pressure in the throat of the valve at the location of the lateral opening. Such single opening through the housing of the valve is so disposed as to be in sealed communication with the opening into the throat of the valve when the closure plate is fully open, all as will hereinafter appear.

Apparatus illustrating the features of my invention is shown in the accompanying drawings forming a part hereof, in which:

Fig. 1 is a side elevational view of a plate type slidable closure valve embodying the features of my invention, the view being partly broken away and in section;

Fig. 2 is a detail sectional view taken generally along line II—II of Fig. 1;

Fig. 3 is a detail sectional view taken generally along line III—III of Fig. 2;

Fig. 3a is a sectional view taken along the line IIIa—IIIa of Fig. 3;

Fig. 4 is a wholly diagrammatic view illustrating the relationship of the diameters and lengths of the throat section and the convergent inlet and outlet sections;

Fig. 5 is a wholly diagrammatic view illustrating the spacing of the lateral inlet openings through which the pressure in the throat of the valve is transmitted to the pressure equalizing compartment from which the mean reading is taken;

Fig. 6 is an enlarged, fragmental sectional view through the valve with the closure member in fully open position and showing my improved aligning and sealing means for a pressure tap into the throat;

Fig. 7 is a detail sectional view taken generally along line VII—VII of Fig. 6; and, Fig. 8 is a detail sectional view taken generally along line VIII—VIII of Fig. 6.

Referring now to the drawings and more particularly to Figs. 1 to 5 inclusive, I show my invention as incorporated in a valve of the well known slidable plate type. As shown, the valve comprises generally a lower housing section 10 and an upper, operating section 11. The lower section 10, being the main fluid passage section of the valve, is the portion thereof which is designed in accordance with my invention.

As best shown in Fig. 2, the body portion 10 of the valve has therein the usual segmental member in the form of a vertically movable, slidable closure 12 having a through opening 13 therein. The closure is disposed in the throat 14 of the housing proper. On the upstream side, the housing of the portion 10 is provided with a converging, frusto conical shape section 15 and the downstream side may be provided with an identical converging cone section 16. The closure 12 is movable from the open position shown in the drawings to a lower closed position by means of an operating screw 17 which may be rotated by a hand wheel 18. The closure halves may fit against seats 19 and 21 and the closure is provided with guides 22 and 23 for guiding the same on its closing movement. The valve body has a well or recess 24 to receive the closure in closed position.

While it is possible accurately to machine the throat section 14 and inlet and outlet sections 15 and 16 of cast housing, I may provide the same with liners 15a and 16a. Through the use of the liners I assure smooth, pit-free passageways through the valve so that if the same is cast any pits and other imperfections present in the casting will not affect the operation of the valve as a fluid metering device.

In the modification of the valve shown in Figs. 1 to 5, inclusive, I provide a chamber 24a on a side of the valve, laterally of the closure plate 12. The chamber 24a may be cast in a removable member 25, which fits in any opening 25a in the housing. The member 25 may be fastened to the housing by means of studs 26 and a gasket 27 may be used to seal around the opening 25a. A gasket 28 is placed in a groove on the inner end of the member 25 and coacts with the sliding closure to seal the chamber 24a. The closure plate 12 has drilled laterally through the side thereof small diameter pressure openings or taps 29, 31 and 32 as shown in Fig. 2. These are spaced axially along the throat of the valve as will later appear. These openings communicate with the chamber 24a when the valve is open.

Connected to the chamber 24a is a conduit 33 which leads to one leg 34 of a manometer indicated generally by the numeral 36. The other leg 37 of the manometer is connected by a line 38 to a pressure tap 3 9in turn connected to the conduit feeding the valve, on the upstream side of the valve.

As best shown in Figs. 4 and 5 my improved valve is built so that there is a definite relationship between the major diameter D of the inlet section, the length L, of the inlet section, the diameter d of the throat section and the length l of the throat section. As before stated, in order to obtain all of the desirable characteristics of my improved valve I find that the beta (d/D) should be between .600 and .625. Likewise, tap 29 should be located .55d from the throat inlet, namely, from line 41, Figs. 2, 4 and 5. In similar manner, tap 31 should be located .66d from line 41 while tap 32 should be located .88d from line 41. Therefore, the pressure reading through the line 33 onto the leg 34 of the manometer is the mean of all of the pressures from the axially spaced taps or openings 29, 31 and 32.

When the beta of the valve is within the range given I find that this mean reading produces volume measurements in which the coefficient of discharge is for all practical purposes unity. In the instance given, the length l of the throat, is between 1.4 and 1.5d, preferably, 1.425d.

Another important feature of my invention lies in the fact that the angle at the meeting edge of the convergent cone section 15 and the cylindrical throat section 14 is sharp and unbroken. I have discovered that this sharp angle at the ends of the sections of the passageway meeting along the line 41 is very important. When this sharp angle construction is combined with the location of the pressure taps as shown, and when the other proportional relationships of the valve are maintained, my improved apparatus is accurate for the measurement of flow of fluids.

In summary with respect to the dimensional relationships of the valve passageways it will be seen that the dimensions l, L, D, and the spacing of the pressure taps 29, 31 and 32 all can be related to the diameter d of the throat. Thus, l is between 1.4 and 1.5d, preferably 1.425d; L is uproportional to the beta of the valve inasmuch as the angle 42 is maintained in the neighborhood of 10.5° or, a total included angle for the convergent section of approximately 21°.

In connection with the angle 42, my experiments so far indicate that while this angle is not precisely critical, nevertheless an angle of 21° clearly is the optimum angle for the convergent cone section 15.

From what has been said, it will be apparent that employing the formulae herein given the configuration and relative dimensions of the passageways through my improved apparatus may be readily reproduced. I prefer also to maintain an unbroken angle along the lines of intersection 43 between the respective inlet and outlet tubes and the convergent and divergent cone sections.

While I have referred specifically only to the details of the upstream convergent cone section 15, for the sake of making the valve reversible except for the location of the taps 29, 31 and 32, the section 16 is identical in all respects with the section 15.

Referring now more particularly to Figs. 6, 7 and 8 of the drawings, I show an improved form of means for sealing a pressure tap or opening in the side of the valve closure 12 with an opening through the housing and for aligning the valve closure when it is in the open position. As will be understood, it sometimes is desirable to employ only a single tap into the throat of the valve. In fact, under some conditions I have found that a tap corresponding in position to tap 29, namely, at .55d, gives a measurement in which the coefficient of discharge of the valve is approximately one. In view of this fact therefore, I provide a single opening 46 into the throat 14 of the valve, through the closure plate portions 12a as shown in Fig. 6. This opening discharges laterally of the opening 14 through a pad 47 having a flat, inclined face 48.

Threaded into the side of the housing 10a of the valve is an outer nut member 49. The nut 49 has internal threads as indicated to receive a second nut 51. Passing rotatably through the bore 52 in the nut 51 is a tubular member 53 having an enlarged inner end 54 thereon with a flat, inclined seat 56, sloped complementarily to the seat 48. Seals 57, 58, and 59 surround the members 49, 51 and 53 as indicated. Further, the fixed seat 48 on the side of the valve closure plate is provided with an annular groove 61 to receive a seal ring 62.

It will be noted from Figs. 7 and 8 that the threads engaging the nut portion 51 inside the nut portion 49 are disposed eccentrically in the nut 49. Therefore, when nut 49 is rotated and nut 51 is held stationary, the inner end 54 of the tube 53 moves about a circular path on a radius equaling the eccentricity between the nuts 49 and 51. Adjacent the outer end of the nut 51 the tube 53 is provided with an indicator member 63 which is placed in alignment with the major axis of the projected ellipse of the enlarged end 54 as the same is viewed in end elevation. Therefore, when the member 63 is held vertical it indicates that the surfaces 48 and 56 are parallel to each other.

On the opposite side of the valve I provide a similar nut 49 and a similar nut 51, the nut 51 being eccentrically threaded into the nut 49 as shown in Fig. 7. I provide a member 64 projecting into the nut 51 as indicated and provide the same with an enlarged head or end 66, similar to the end 54. In like manner, I provide a member 67 which when held vertical parallels the sloping surface 68 of the head 66 with the sloping surface 69 of a pad 71. The pad 71 is located on the opposite side of the closure 12a, from pad 47 and is in horizontal alignment with the pad 47. Therefore, by bringing the valve closure 12a to a position with the opening 13a accurately aligned with the opening in the throat section of the valve, then running in on the nuts 51, holding the indicating pins or members 63 and 67 vertical, I provide not only an effective sealing of the opening in the tube 53 with the opening 46 but also accurately align the opening 13a in closure member 12a vertically with the fluid passage in the throat section of the valve.

From the foregoing it will be apparent that I have devised an improved flow indicating apparatus which with equal facility may be used as a flow measuring device or, as a combined flow measuring device and shut off valve. Obviously, the closure may be omitted and the housing constructed as herein described, and such apparatus will serve as flow measuring or primary device only. In actual practice I have found that my improved apparatus is reliable and efficient. In checking the same against a flow meter of known accuracy I find my improved apparatus to be as accurate as the square edged orifice. Furthermore, pressure recovery in my improved apparatus runs approximately 85%.

From all the foregoing it will be seen that the reading from the manometer or other pressure indicating apparatus may be used in the usual head meter equations to obtain the unit volume of flow through the apparatus.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In fluid measuring apparatus, a housing, there being a fluid passage in the housing comprising a cylindrical throat section and a frusto conical convergent section joined in a sharp and unbroken angle to the upstream end of the throat section, the relation of the diameter of the throat section to the major diameter of the convergent section ($d/D$) being .600 to .625, the included angle of the convergent section being approximately 21°, the length ($l$) of the throat section being between $1.4d$ and $1.5d$, there being at least one laterally directed opening extending from outside the housing into the throat and positioned approximately $.50d$ to $.60d$ from the upstream end of the throat section, and a connection by means of which pressure in said lateral opening may be impressed on a pressure actuated indicator.

2. Apparatus as defined in claim 1 in which a valve closure is positioned in said throat section and is slidable between open and closed positions, said closure having a fluid passage therein alignable with the fluid passage in said throat section when the closure is opened, means to slide the closure between open and closed positions, and means to align the fluid passages in the throat section and in the closure.

3. Apparatus as defined in claim 1 in which a shut-off valve having a closure therein is positioned at said throat section, said closure being slidable between open and closed positions and having a through fluid passage therein alignable with the fluid passage in said throat section when the closure is opened, a lateral opening in said closure in communication with the through fluid passage therein and opening adjacent a side of the closure, a tube projecting through said housing and disposed when the valve closure is open to communicate with the lateral opening in the closure, and means to adjust the axial and radial positions of said tube relative to the lateral opening in the closure whereby the end of said tube acts as an aligning stop to center the through passage in the closure with the throat passage.

4. Apparatus as defined in claim 3 in which the means to adjust the position of said tube comprises a nut threaded into the housing of the valve alongside the side of the closure therein, an eccentrically threaded bore in said nut, a second nut in said eccentrically threaded bore, said tube being inserted in the center of said second nut.

5. Apparatus as defined in claim 4 in which a rotatable stop member is disposed in said second nut and has an end disposed to contact the side of the closure, thereby to limit the movement of the closure toward open position.

6. Apparatus as defined in claim 4 in which a plurality of lateral openings is spaced on centers from the upstream end of the throat section approximately as follows: $.55d$, $.66d$, and $.88d$.

References Cited in the file of this patent

UNITED STATES PATENTS

| 1,577,909 | Kath | Mar. 23, 1926 |
| 1,631,481 | Gfeller | June 7, 1927 |
| 1,700,027 | Connet | Jan. 22, 1929 |
| 1,958,610 | Connet | May 15, 1934 |
| 2,693,110 | Terrell | Nov. 2, 1954 |
| 2,704,555 | Dall | Mar. 22, 1955 |

FOREIGN PATENTS

| 482,150 | Germany | Sept. 9, 1929 |
| 473,562 | Great Britain | Oct. 15, 1937 |

OTHER REFERENCES

Publication—"Fluid Meters, Their Theory and Application," Part I, Report of A. S. M. E. Special Research Committee on Fluid Meters, published in 1924 by A. S. M. E., pp. 21, 22 and 28.